(12) United States Patent
Yoo et al.

(10) Patent No.: US 6,682,310 B2
(45) Date of Patent: Jan. 27, 2004

(54) APPARATUS AND METHOD FOR CONTROLLING OPERATION OF RECIPROCATING MOTOR COMPRESSOR

(75) Inventors: Jae-Yoo Yoo, Gwangmyeong (KR); Min-Kyu Hwang, Gwangmyeong (KR); Chel Woong Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 58 days.

(21) Appl. No.: 10/140,869

(22) Filed: May 9, 2002

(65) Prior Publication Data

US 2003/0026701 A1 Feb. 6, 2003

(30) Foreign Application Priority Data

Aug. 1, 2001 (KR) .......................................... 2001-46576
Aug. 1, 2001 (KR) .......................................... 2001-46578

(51) Int. Cl.$^7$ ................................................. F04B 49/00
(52) U.S. Cl. ..................... 417/42; 417/44.1; 417/44.11; 417/45; 417/212; 318/687
(58) Field of Search ..................... 417/42, 44.1, 44.11, 417/45, 212; 318/687

(56) References Cited

U.S. PATENT DOCUMENTS

| | | | | |
|---|---|---|---|---|
| 4,808,901 A | * | 2/1989 | Sakamoto | .................. 318/687 |
| 5,447,414 A | * | 9/1995 | Nordby et al. | ................. 417/20 |
| 5,496,153 A | * | 3/1996 | Redlich | ....................... 417/212 |
| 5,980,211 A | * | 11/1999 | Tojo et al. | ...................... 417/45 |
| 6,231,310 B1 | * | 5/2001 | Tojo et al. | ................. 417/44.1 |
| 6,515,440 B2 | * | 2/2003 | Koga et al. | .................. 318/135 |
| 6,518,718 B2 | * | 2/2003 | Koga et al. | .................... 318/38 |
| 6,520,746 B2 | * | 2/2003 | Yoo et al. | ................. 417/44.11 |
| 6,527,519 B2 | * | 3/2003 | Hwang et al. | ........... 417/44.11 |

* cited by examiner

*Primary Examiner*—Cheryl J. Tyler
(74) *Attorney, Agent, or Firm*—Birch, Stewart, Kolasch & Birch, LLP

(57) ABSTRACT

An apparatus and method for operational control of a reciprocating motor compressor, includes performing an operation of the reciprocating motor compressor precisely and accurately. In addition, with the above apparatus and method, the phase difference between a first speed value of the motor (or first TDC value) and current applied to the motor is detected, the second speed value of the motor at the inflection point of the detected phase value (or second TDC value) is detected and stored as a reference value, and the speed of the motor is controlled on the basis of the reference value and the first speed value of the motor (or the first TDC value).

22 Claims, 7 Drawing Sheets

APPARATUS AND METHOD FOR CONTROLLING OPERATION OF RECIPROCATING MOTOR COMPRESSOR

BACKGROUND OF THE INVENTION

1. Field of the Invention

The present invention relates to a reciprocating motor compressor and particularly, to an apparatus and method for operation control of a reciprocating motor compressor, for controlling operation of a reciprocating motor compressor on the basis of speed information or Top Dead Center (TDC) information.

2. Description of the Background Art

Generally, by eliminating the use of a crankshaft for converting a rotary motion into a reciprocating motion, a reciprocating motor compressor has a low frictional loss, and accordingly the reciprocating motor compressor is superior to a general compressor in the compressing efficiency aspect.

When the reciprocating motor compressor is used for a refrigerator or an air conditioner, a cooling capacity of the refrigerator or the air conditioner can be controlled by varying a compression ratio of the reciprocating motor compressor by varying a stroke voltage applied to the reciprocating motor compressor. The reciprocating motor compressor will be described with reference to accompanying FIG. 1.

FIG. 1 is a schematic block diagram illustrating the construction of an apparatus for controlling the operation of a reciprocating motor compressor in accordance with the prior art.

As depicted in FIG. 1, the apparatus for controlling the operation of a reciprocating motor compressor in accordance with the prior art applies a voltage detecting unit 14 for detecting a voltage applied to the reciprocating motor compressor 13 according to the variation of the stroke, and a current detecting unit 12 detects a current applied to the reciprocating motor compressor 13 according to the variation of the stroke. A microcomputer 15 calculates the stroke by using the voltage detected by the voltage detecting unit 14 and the current detected from the current detecting unit 12, comparing the calculated stroke with the stroke reference value and outputting a switching control signal according to the comparison result. And a power supply unit 11 supplies the stroke voltage to the reciprocating motor compressor 13 by on-off controlling the supplying of AC power to the reciprocating motor compressor 13 using a triac Tr1 controlled by the switching control signal from the microcomputer 15. Here, the stroke of the reciprocating motor compressor 13 is varied in accordance with the voltage supplied to the motor according to the stroke reference value, and moves the piston back and forth according to the varied stroke.

Hereinafter, the operation of the apparatus for controlling the operation of the reciprocating motor compressor will be described.

First, the stroke of the reciprocating motor compressor 13 is varied in accordance with the voltage supplied to the motor according to the stroke reference value, and moves the piston back and forth according to the varied stroke. Herein, the term "stroke" means a distance over which the piston inside the reciprocating motor compressor 13 moves while performing a reciprocating motion (moving back and forth).

When the triac Tr1 of the power supply unit 11 has a longer turn-on duration in accordance with the switching control signal outputted from the microcomputer 15, at this time the AC turn-on power is supplied to the reciprocating motor compressor 13, and the reciprocating motor compressor 13 operates. Herein, the voltage detecting unit 14 and the current detecting unit 12 respectively detect a voltage and a current applied to the reciprocating motor compressor 13 and respectively output the detected voltage and current to the microcomputer 15.

The microcomputer 15 calculates the stroke by using the voltage and the current detected from the voltage detecting unit 14 and the current detecting unit 12, compares the calculated stroke with the stroke reference value and outputs the switching control signal according to the comparison result. In more detail, when the calculated stroke value is smaller than the stroke reference value, the microcomputer 15 increases the stroke voltage supplied to the reciprocating motor compressor 13 by outputting a switching control signal for lengthening the turn-on cycle of the triac Tr1 in the power supply unit 11.

On the contrary, when the calculated stroke value is larger than the stroke reference value, the microcomputer 15 decreases the stroke voltage supplied to the reciprocating motor compressor 13 by outputting a switching control signal for shortening the turn-on cycle of the power supply unit 11.

However, because the reciprocating motor compressor control apparatus according to the prior art controls the operation of the reciprocating motor compressor by comparing the calculated stroke with the stroke reference value and outputting a switching control signal to the power supply unit according to the comparison result, the operation of the reciprocating motor compressor can not be controlled accurately. In more detail, since the reciprocating motor compressor control apparatus according to the prior art has a severe non-linearity in its mechanical motion functions, the operation of the reciprocating motor compressor can not be performed precisely and accurately by a linear control method without considering the non-linearity.

In addition, in the reciprocating motor compressor control apparatus according to the prior art, when the reciprocating motor compressor is operated continually in accordance with an initial detected switching control signal, a position of the piston may deviate from TDC (Top Dead Center)≈0 due to a load variation according to changes in a refrigerator and other circumstances.

SUMMARY OF THE INVENTION

Therefore, an object of the present invention is to provide an apparatus and method for operation control of a reciprocating motor compressor, capable of compensating speed errors of the motor on the basis of the speed reference value or compensation value due to a load variation, after setting the speed value of a motor at TDC≈0 as the speed reference value.

Another object of the present invention is to provide an apparatus and method for operation control of a reciprocating motor compressor, capable of compensating TDC errors on the basis of the TDC reference value and compensation value due to a load variation, after setting the TDC value of a motor at TDC≈0 as the TDC reference value.

To achieve these and other advantages and in accordance with the purpose of the present invention, as embodied and broadly described herein, there is provided an apparatus for controlling operation of a reciprocating motor compressor, including a speed detecting unit for detecting a first speed value of a motor on the basis of a current and voltage applied to the motor, a phase value detecting unit for detecting a second speed value of the motor at the inflection point of the detected phase value a speed reference value storage unit for setting the second speed value as a speed reference value and storing the value and a control unit for comparing the stored speed reference value and the first speed value detected from the speed detecting unit, outputting the corresponding comparison signals, and controlling the speed of the motor with the generated switching control signal according to the comparison signals.

To achieve these and other advantages and in accordance with the purpose of the present invention, as embodied and broadly described herein, there is provided the method for controlling operation of the reciprocating motor compressor, including the steps of detecting phase difference of a first speed value of a motor and a current applied to the motor, detecting a second speed value of the motor from an inflection point of the detected phase value and storing the value as a speed reference value and controlling speed of the motor on the basis of the speed reference value and first speed value of the motor.

To achieve these and other advantages and in accordance with the purpose of the present invention, as embodied and broadly described herein, there is provided the apparatus for controlling operation of the reciprocating motor compressor, including a TDC detecting unit for detecting a first TDC value of a piston in a compressor, a phase value detecting unit for detecting a second TDC value of the motor at the inflection point of the detected phase value after detecting the phase difference between the voltage and current applied to the motor in the compressor, a TDC reference value storage unit for setting the second TDC value as a TDC reference value and storing the value and a control unit for comparing the stored TDC reference value and the first TDC value, outputting the corresponding comparison signals, and controlling the TDC of the motor with the generated switching control signal according to the comparison signals.

To achieve these and other advantages and in accordance with the purpose of the present invention, as embodied and broadly described herein, there is provided the method for controlling operation of the reciprocating motor compressor, including the steps of the method for controlling operation of the reciprocating motor compressor, including the steps of detecting a first TDC value of a piston in the compressor, detecting a phase difference between a voltage and current applied to the motor in the compressor, detecting a second TDC value of the motor from an inflection point of the detected phase value and storing the value as a TDC reference value and comparing the TDC reference value and the first TDC value of the motor and controlling TDC of the motor on the basis of the comparison result. The foregoing and other, features, aspects and advantages of the present invention will become more apparent from the following detailed description when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

The present invention includes the steps of obtaining a phase difference between the speed of a motor in a reciprocating motor compressor and a current applied to the motor, detecting the speed corresponding to the point of 'TDC≈0' at an inflection point of the phase value, storing the detected speed corresponding to the point of 'TDC≈0' as a speed reference value (reference value) and controlling the speed of the actual speed of the motor by comparing the stored speed reference and speed values. A first embodiment of the present invention will be described with reference to FIGS. 2 to 5.

Figure 1:
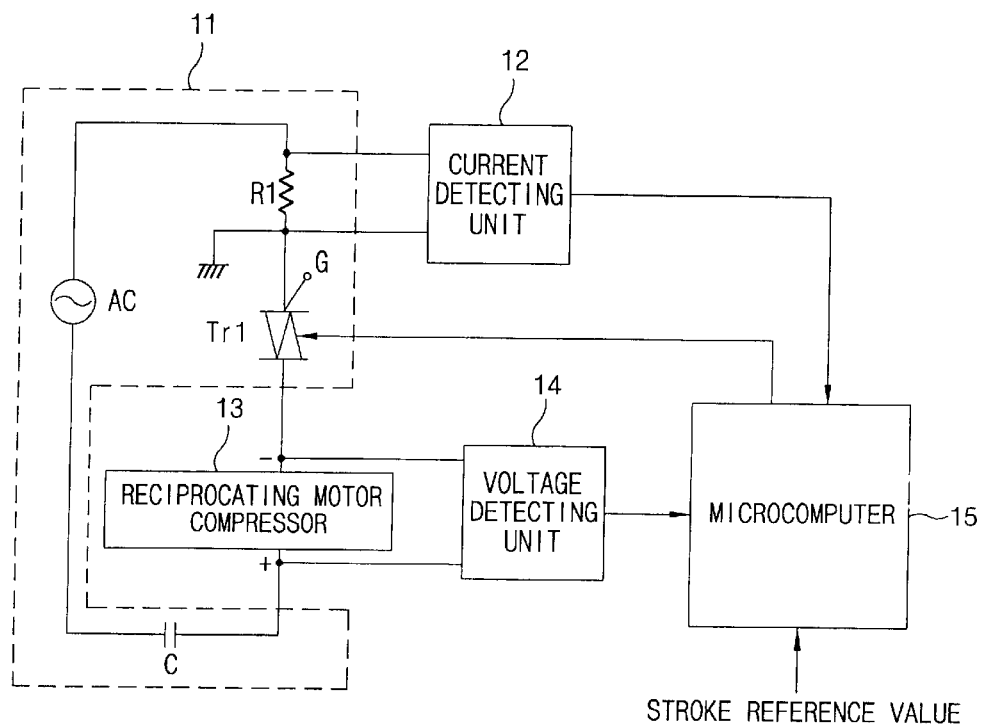
FIG. 1 is a block diagram illustrating the construction of an apparatus for controlling the operation of a reciprocating motor compressor in accordance with the prior art.
Figure 2:
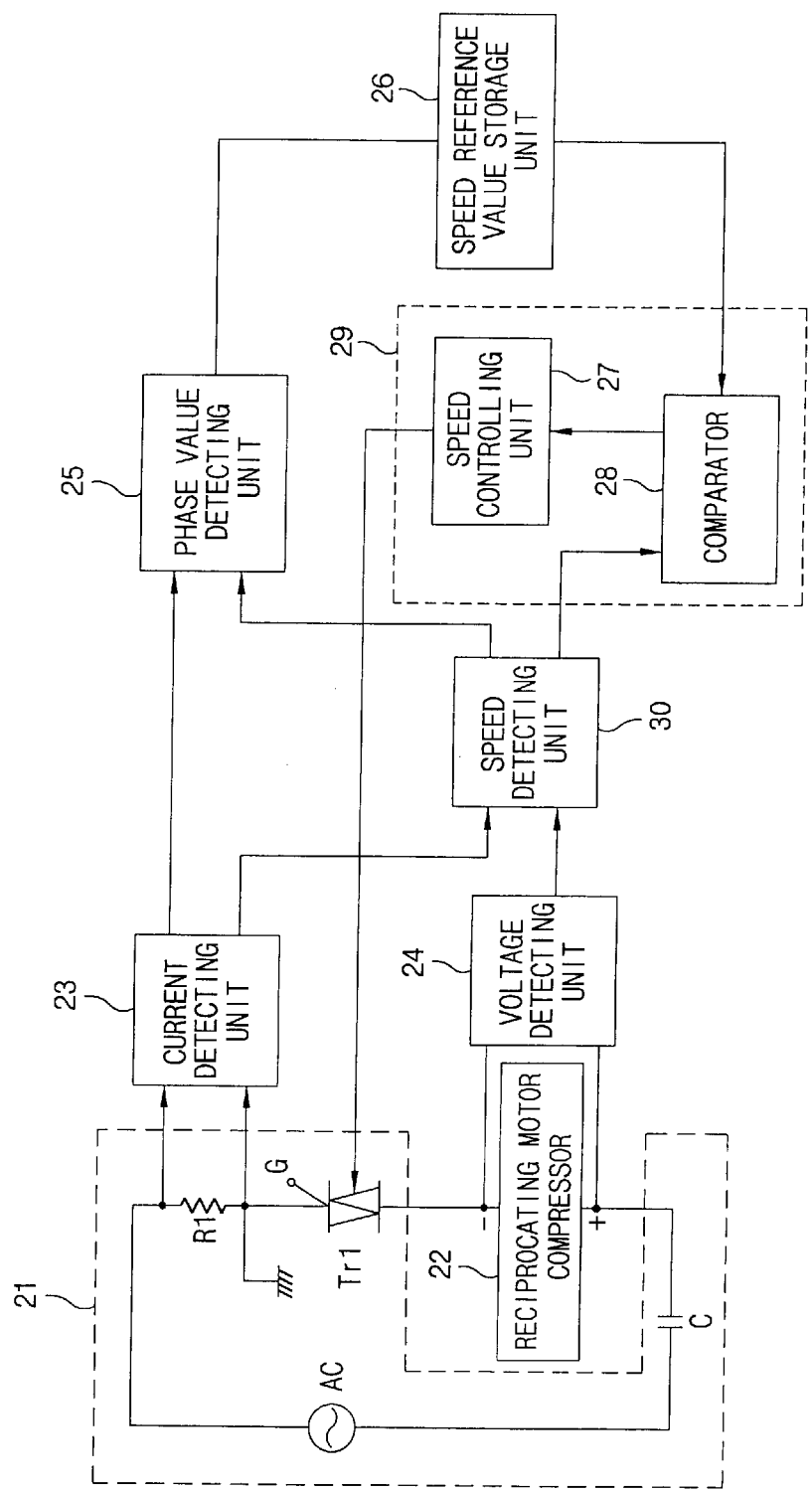
FIG. 2 is a block diagram illustrating the construction of an apparatus for controlling the operation of a reciprocating motor compressor in accordance with a first embodiment of the present invention.

FIG. 2 is a block diagram illustrating the construction of an apparatus for controlling the operation of a reciprocating motor compressor in accordance with a first embodiment of the present invention.

As shown in FIG. 2, the apparatus for controlling operation of the reciprocating motor compressor includes a current detecting unit 23 for detecting a current applied to a motor in a reciprocating motor compressor 22, a voltage detecting unit 24 for detecting a voltage applied to the motor, a speed detecting unit 30 for detecting a speed value of the motor using the detected current and voltage, a phase value detecting unit 25 for detecting the speed value of the motor at the inflection point of the detected phase value (recognizing the inflection point as TDC≈0), a speed reference value storage unit 26 for storing the detected speed value of the motor detected from the phase value detecting unit 25 as a speed reference value (reference value), a control unit 29 for comparing the speed reference value and the speed value of the motor detected from the speed detecting unit 30, and outputting a switching control signal for controlling the speed of the motor according to the comparison result and a electric circuit unit 21 for supplying a voltage to the reciprocating motor compressor 22 (the motor in the reciprocating motor compressor) by on-off controlling the supplying of AC power using an interior triac Tr1 according to the switching control signal. Here, the TDC (Top Dead Center) means a distance between an upper surface of a piston (not shown) in the compressor and a lower surface of a discharge valve (not shown) in the compressor.

The control unit 29 includes a comparator 28 for comparing the speed reference value and the first speed value of the motor detected from the speed detecting unit 30 and outputting the corresponding comparison signal and a speed control unit 27 for outputting the switching control signal for controlling the voltage applied to the motor according to the comparison signal outputted from the comparator 28. Hereinafter, the operation of the apparatus for controlling operation of the reciprocating motor compressor will be described with reference to FIG. 3.

Figure 3:
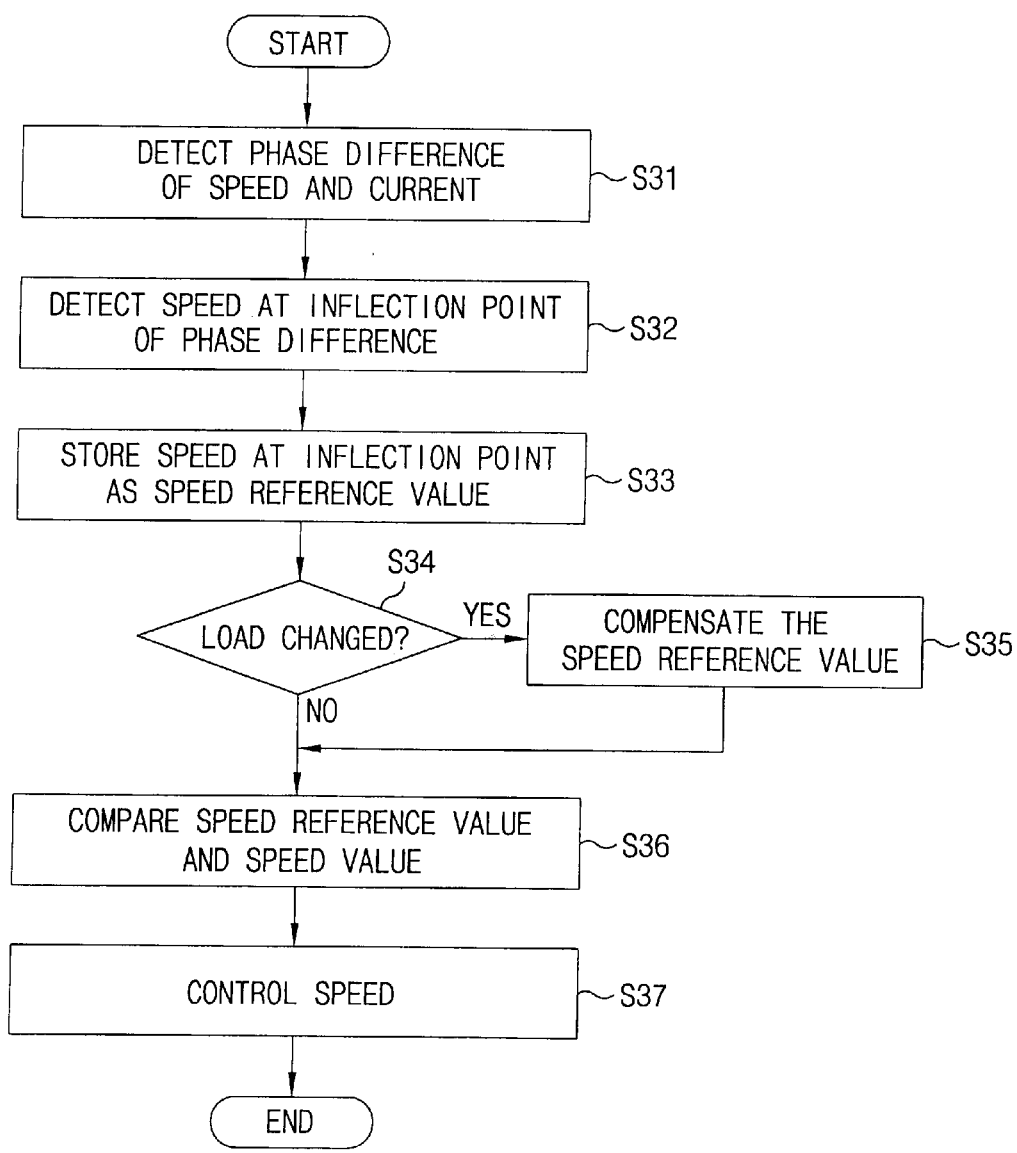
FIG. 3 is a flow chart illustrating a method for controlling the operation of a reciprocating motor compressor in accordance with the first embodiment of the present invention.

FIG. 3 is a flow chart illustrating a method for controlling the operation of a reciprocating motor compressor in accordance with the first embodiment of the present invention. Namely, under the condition of a peculiar loading, the method includes the steps of detecting a phase difference between an initial speed value of a motor and the current applied to the motor, detecting a speed value of the motor from an inflection point of the detected phase value and storing the value as a speed reference value and controlling speed of the motor on the basis of the speed reference value and the initial speed value of the motor. The apparatus and method for controlling operation of the reciprocating motor compressor in accordance with the present invention will be described in detail as follows.

First, the current detecting unit 23 detects the current applied to the motor in the reciprocating motor compressor 22 and outputs the current into the speed detecting unit 30 and the phase value detecting unit 25. At this time, the voltage detecting unit 24 detects the voltage applied to the motor in the reciprocating motor compressor 22 and outputs the voltage into the speed detecting unit 30.

The speed detecting unit 30 calculates the speed value of the motor using the current and voltage and outputs the calculated speed value of the motor into the phase value detecting unit 25.

The phase value detecting unit 25 detects a phase difference between the speed value of the motor calculated from the speed detecting unit 30 and the current detected from the current detecting unit 23, or between the power voltage (220V/50 Hz, 220V/60 Hz, 110V/60 Hz, 110V/ 50 Hz) and the detected current, or between the detected current and the detected voltage (S31). The phase value detecting unit 25 at the inflection point of the phase value is detected (S32) and is set as the speed reference value. Also, the phase value detecting unit 25 stores the speed reference value in the speed reference value storage unit 26 (S33). Here, the speed value of the motor detected at the inflection point of the phase value means the speed value corresponding to the point of 'TDC≈0'.

Then, if there is no load variation in the reciprocating motor compressor 22 (S34), the comparator 28 in the control unit 29 receives the speed reference value stored in the speed reference value storage unit 26, compares the value the speed value of the motor detected from the speed detecting unit 30 and outputs the corresponding comparison signal into the speed control unit 27 (S36).

The speed control unit 27 applies the switching control signal for controlling the speed of the motor into the triac Tr1 of the electric circuit unit 21 according to the comparison signal outputted from the comparator 29. At this time, the electric circuit unit 21 controls the speed of the motor (S37) by applying the predetermined voltage for driving the motor by on-off controlling the supplying of AC power using an interior triac Tr1 according to the switching control signal outputted from the speed control unit 27. Accordingly, the speed of the motor is controlled precisely and accurately.

On the other hand, if there is a load variation in the reciprocating motor compressor, the control unit 29 sets a new speed reference value by adding or subtracting the speed reference value by a compensation value corresponding to the lookup table and controls the speed of the motor with the new speed reference value. Namely, if there is a load variation in the reciprocating motor compressor (S34), the comparator 28 in the control unit 29 reads the corresponding compensation value from the lookup table and compensates the speed reference value by adding or subtracting the speed reference value by the compensation value (S35), compares the compensated speed reference value and the speed value of the motor detected from the speed detecting unit 30 (S36) and controls the speed of the motor according to the comparison result (S37). Here, the lookup table is stored in the storage unit (not shown) in the control unit 29 and the compensation value set in advance by the experiment of the present invention is stored in the lookup table in advance. Namely, the compensation value means the difference value between the speed value of the motor according to the load and the speed reference value, compensated through the experiment in advance.

Figure 4:
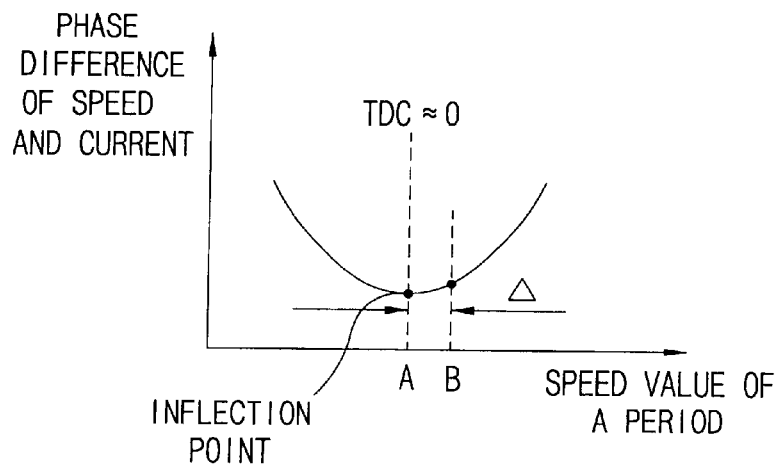
FIG. 4 is a view illustrating changes in phase difference between the speed of the motor and current according to speed value of the motor in a period.

FIG. 4 is a view illustrating changes in phase difference between the speed of the motor and current according to speed value of the motor in a period.

As shown in FIG. 4, as the speed value of the motor increases, the phase difference of the speed of the motor and current are decreased and increased from the point of 'TDC≈0' and this point is called as an inflection point.

Here, the 'speed value in a period' means a value obtained by subtracting the maximum value of the speed of the motor in a period (for example, $\frac{1}{60}$[sec]) by the minimum value. Also, the point A represents a speed value at the point of time when the inflection point is generated (a point of time when the slope is changed) and the point B represents the increased speed value of the motor to find the point A. Namely, to detect the point of time when the slope is changed according to the phase difference, the speed value of the motor is increased as much as Δ from the speed value at the inflection point of the phase value.

Therefore, the inflection point of the phase value can be detected by the phase difference between the speed of the motor and the current applied to the motor. Namely, after detecting the phase difference between the speed of the motor and the current applied to the motor, the speed of the motor at the inflection point of the detected phase value is detected and stored as a speed reference value.

Figure 5:
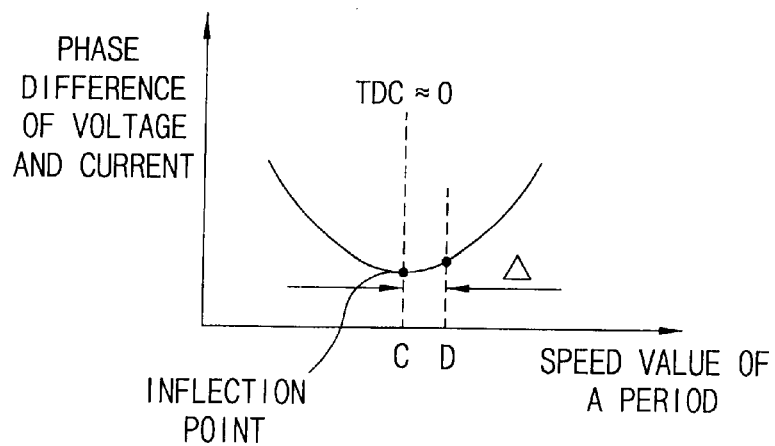
FIG. 5 is a view illustrating changes in a voltage and current according to speed value of the motor in a period.

FIG. 5 is a view illustrating changes in the voltage and current according to speed value of the motor in a period.

As shown in FIG. 5, as the speed value of the motor increases, the phase difference between the current and voltage applied to the motor decreases and increases from the point of TDC≈0. Here, a point C represents the speed value of the motor when the inflection point (point of time when the slope is changed) is generated, a point D represents the speed value of the motor which is increased to search the point C. Namely, the speed value of the motor is increased as much as Δ than the speed value when the inflection point of the phase value (speed reference value≈point C) to detect the point that the slope is changed according to the phase difference (inflection point: point C).

Therefore, by the phase difference between the voltage and current applied to the motor, the inflection point of the phase value can be detected. Namely, under a specific load condition, after detecting the phase difference between the voltage and current applied to the motor, the speed value at the inflection point of the detected phase difference is detected and the value is stored as speed reference value.

On the other hand, the speed value of the motor at the inflection point is detected by repeatedly performing the process for detecting the inflection point of the phase value for predetermined times before shipping of the products.

Hereinafter, the second embodiment of the present invention, capable of controlling the TDC by obtaining the speed value of the motor at the inflection point, detecting the TDC value under the condition of 'TDC≈0', storing the above TDC value as the TDC reference value and comparing the stored TDC reference value and the TDC value of the motor, will be described in detail with reference to FIGS. 6 to 9. Also, reference numerals in the second embodiment same as in the first embodiment will be designated as different reference numerals, to describe the second embodiment in accordance with the present invention in detail.

Figure 6:
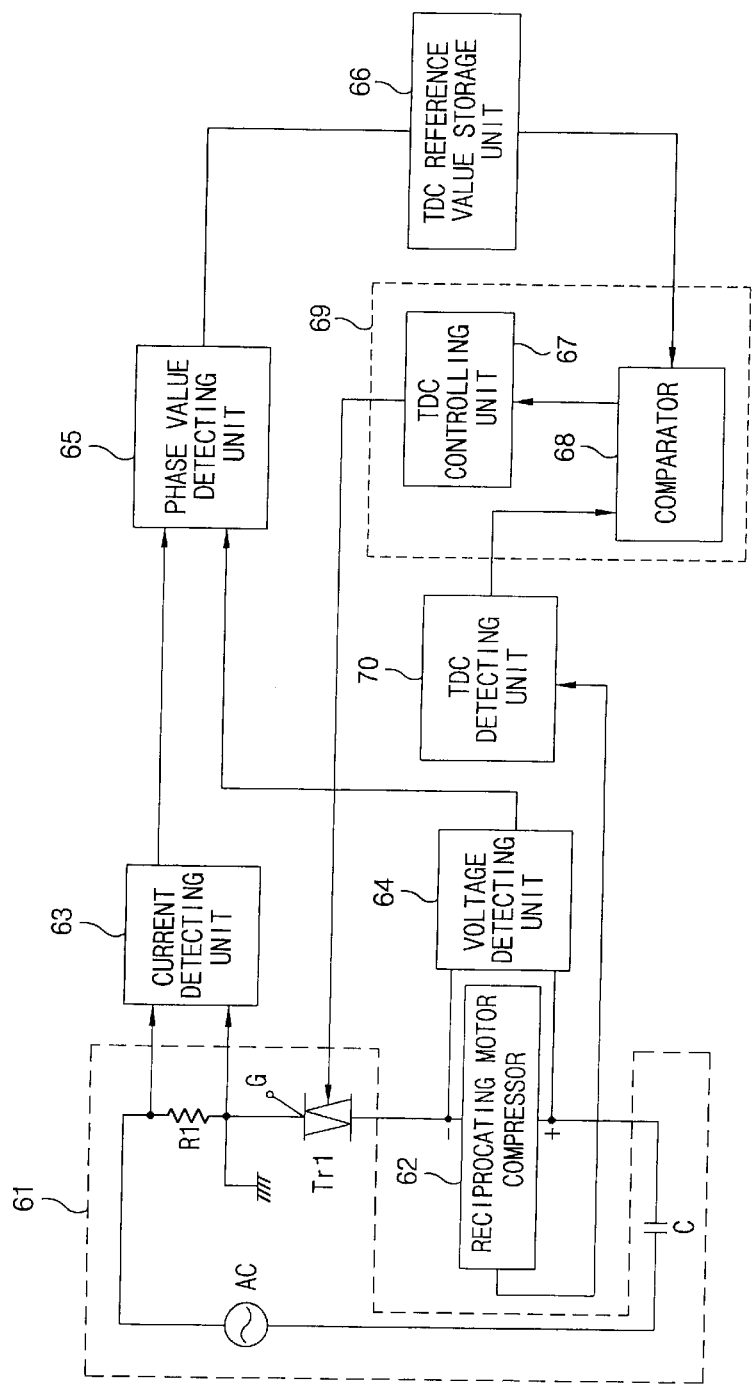
FIG. 6 is a view illustrating the construction of the apparatus for controlling the operation of the reciprocating motor compressor in accordance with a second embodiment of the present invention.

FIG. 6 is a view illustrating the construction of the apparatus for controlling the operation of the reciprocating motor compressor in accordance with a second embodiment of the present invention.

As shown in FIG. 6, the apparatus includes a current detecting unit 63 for detecting a current applied to a motor in a reciprocating motor compressor 62, a voltage detecting unit 64 for detecting a voltage applied to the motor, a TDC detecting unit 70 for detecting a TDC (Top Dead Center) value of the piston of the compressor using a sensor (not shown) inserted in the motor, a phase value detecting unit 65 for detecting the TDC value at the inflection point of the detected phase value, a TDC reference value storage unit 66 for storing the detected TDC value detected from the phase value detecting unit 65 as a TDC reference value, a control unit 69 for comparing the TDC reference value and the TDC value detected from the speed detecting unit 70, and outputting a switching control signal for controlling the TDC according to the comparison result and an electric circuit unit 61 for supplying a voltage to the reciprocating motor by on-off controlling the supplying of AC power using an interior triac TR1 according to the switching control signal.

Here, the control unit 69 includes a comparator 68 for comparing the TDC reference value and the TDC value of the piston detected from the speed detecting unit 70 and outputting the corresponding comparison signal and a speed control unit 67 for outputting the switching control signal for controlling the voltage applied to the motor according to the comparison signal outputted from the comparator 68. Hereinafter, the operation of the apparatus for controlling operation of the reciprocating motor compressor in accordance with the second embodiment will be described with reference to FIG. 7.

Figure 7:
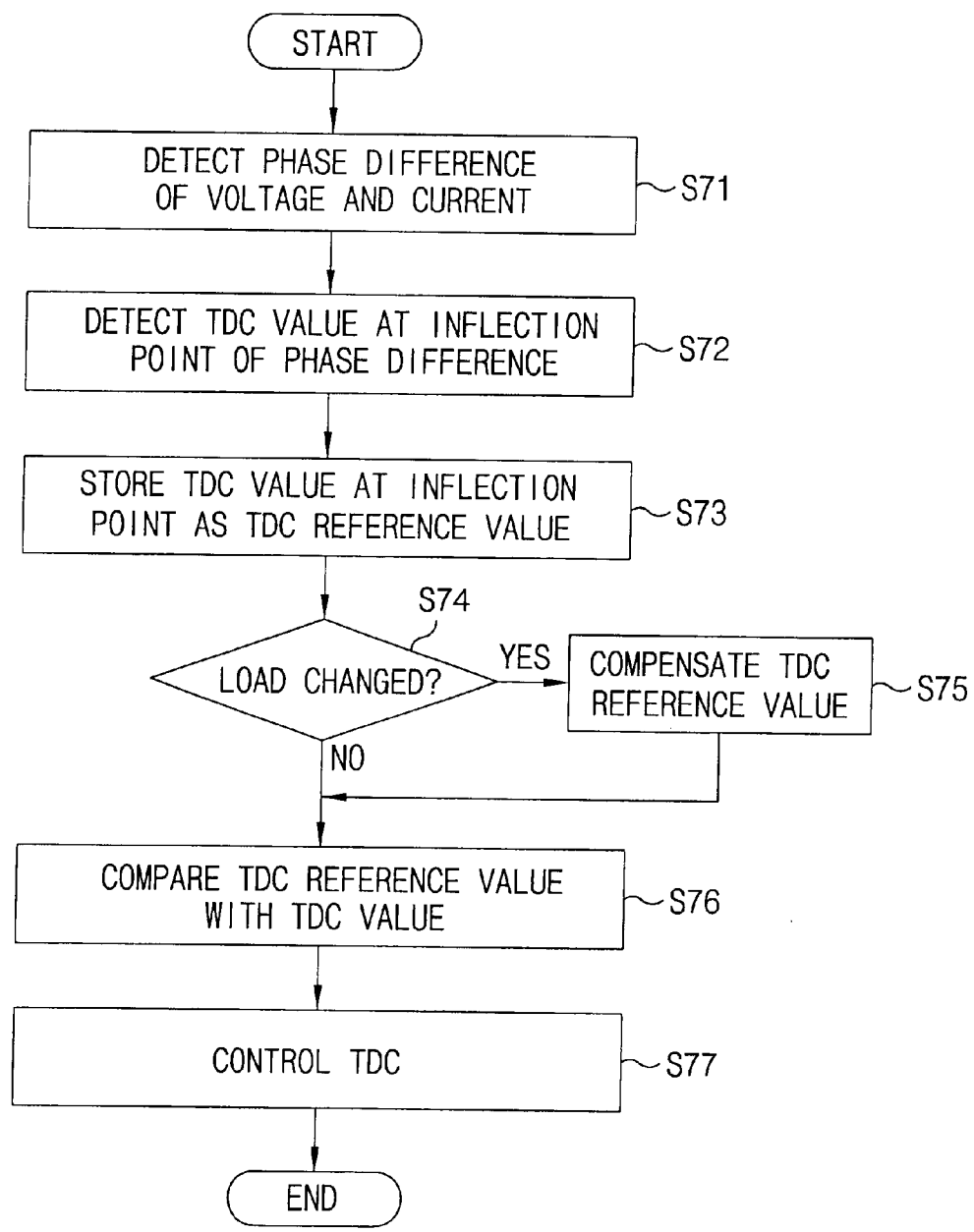
FIG. 7 is a flow chart illustrating the method for controlling the operation of the reciprocating motor compressor in accordance with the second embodiment of the present invention.

FIG. 7 is a flow chart illustrating the method for controlling the operation of the reciprocating motor compressor in accordance with the second embodiment of the present invention.

As shown in FIG. 7, under the condition of a peculiar loading, the method includes the steps of detecting phase difference on the basis of the phase difference between the voltage and current applied to the motor, detecting a TDC value from an inflection point of the detected phase value and storing the value as a TDC reference value and controlling TDC comparing the TDC reference value and the TDC value.

First, the current detecting unit 63 detects the current applied to the motor in the reciprocating motor compressor 62 and outputs the current into the TDC detecting unit 70 and the phase value detecting unit 65. At this time, the voltage detecting unit 64 detects the voltage applied to the motor and outputs the voltage into the phase value detecting unit 65.

The phase value detecting unit 65 detects a phase difference between the voltage and current, or between the power voltage (220V/50 Hz, 220V/60 Hz, 110V/60 Hz, 110V/50 Hz) and the detected current, or between the detected speed of the motor and the detected current (S71). The phase value detecting unit 65 detects the TDC value of the piston at the inflection point (S72) and the value is set as the TDC reference value. Also, the phase value detecting unit 65 stores the TDC reference value in the TDC reference value storage unit 66 (S73). Here, the TDC value of the motor detected at the inflection point of the phase value means the TDC value corresponding to the point of 'TDC≈0'.

Then, the TDC detecting unit 70 detects the TDC value of the piston using the sensor inserted in the motor and outputs the TDC value of the piston into the control unit 69 (S71).

If there is no load variation in the reciprocating motor compressor 62 (S74), the comparator 68 in the control unit 69 receives the TDC reference value stored in the TDC reference value storage unit 66, compares the value the TDC value of the piston detected from the TDC detecting unit 70 and applies the corresponding comparison signal into the TDC control unit 67 (S76).

The TDC control unit 67 applies the switching control signal for controlling the TDC into the electric circuit unit 61 according to the comparison signal outputted from the comparator 69.

At this time, the electric circuit unit 61 controls the speed of the motor (S77) by applying the predetermined voltage for driving the motor by on-off controlling the supplying of AC power using an interior triac Tr1 according to the switching control signal outputted from the TDC control unit 67. Accordingly, the TDC of the motor is controlled precisely and accurately.

Namely, if there is a load variation in the reciprocating motor compressor (S74), the comparator 68 in the control unit 69 sets a new TDC reference value by adding or subtracting the TDC reference value by the compensation value in the lookup table and controls the TDC of the piston in the compressor with the newly set compensation value. Namely, the comparator 68 reads the corresponding compensation value in the lookup table, compensates the TDC reference value by adding or subtracting the TDC reference value by the compensation value and controls the TDC of the piston in the compressor by comparing the compensated TDC reference value and the TDC value of the motor detected from the TDC detecting unit 70 (S76). Here, the lookup table is stored in the storage unit (not shown) in the control unit 69 and the compensation value set in advance by the experiment of the present invention is stored in the lookup table in advance. Namely, the compensation value means the difference value between the TDC value of the piston according to the load and the TDC reference value.

Figure 8:
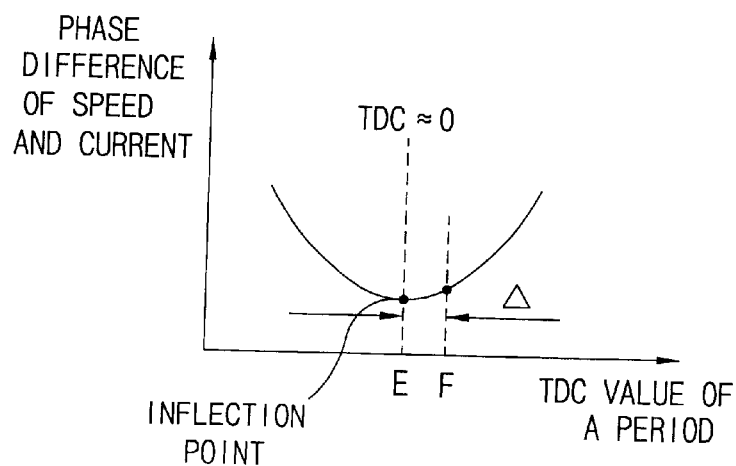
FIG. 8 is a view illustrating changes in speed of the motor and phase difference of a current according to TDC (Top Dead Center) value of a period.

FIG. 8 is a view illustrating changes in TDC of the motor and phase difference of a current according to TDC (Top Dead Center) value of a period.

As shown in FIG. 8, as the TDC value of the motor increases, the phase difference between the speed of the motor and current is decreased and increased from the point of 'TDC≈0' and this point is called as an inflection point. Here, the point E represents a TDC value at the point of time when the inflection point is generated (a point of time when the slope is changed) and the point F represents the increased TDC value of the motor to find the point E. Namely, to detect the point of time when the slope is changed (point E) according to the phase difference, the TDC value of the motor is increased as much as Δ from the TDC value when the inflection point of the phase value.

Therefore, the inflection point of the phase value can be detected by the phase difference between the speed of the motor and the current applied to the motor. Namely, after detecting the phase difference, the TDC of the motor at the inflection point of the detected phase value is detected and stored as a TDC reference value.

Figure 9:
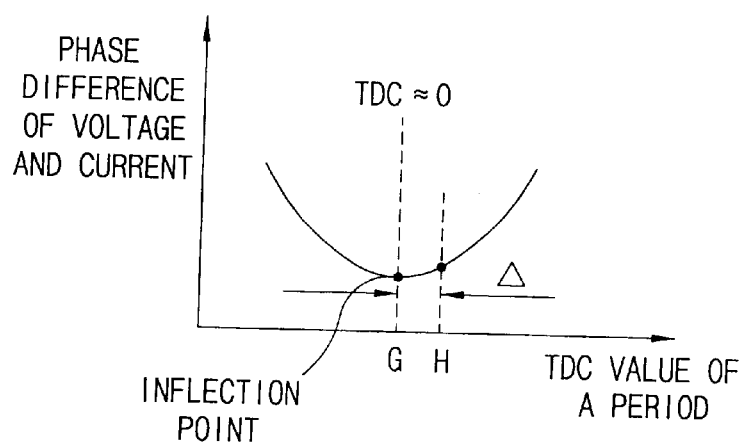
FIG. 9 is a view illustrating changes in a voltage and current according to TDC value of a period.

FIG. 9 is a view illustrating changes in a voltage and current according to TDC value of a period.

As shown in FIG. 9, as the TDC value of the motor increases, the phase difference between the current and voltage applied to the motor decreases and increases from the point of TDC≈0. Here, a point G represents the TDC value of the motor when the inflection point (point of time when the slope is changed) is generated, a point H represents the TDC value of the motor which is increased to search the point G. Namely, the TDC value of the motor is increased as much as Δ than the speed value when the inflection point of the phase value (speed reference value≈point G) to detect the point that the slope is changed according to the phase difference (point G). Namely, under a specific load condition, after detecting the phase difference between the voltage and current applied to the motor, the TDC value at the inflection point of the detected phase difference is detected and the value is stored as TDC reference value.

Here, the TDC value of the motor at the inflection point is detected by repeatedly performing the process for predetermined times before shipping of the products.

As described above, with the present invention, the operation of the reciprocating motor compressor can be controlled precisely and accurately, by comparing the speed reference value detected from the inflection point of the phase value and initial speed value of the motor, outputting the corresponding comparison signal and controlling the operation of the reciprocating motor compressor with the switching control signal for controlling speed of the motor according to the comparison signal.

Also, with the present invention, speed error of the motor in the reciprocating motor compressor can be compensated by setting the speed value at the point of 'TDC≈0' detected under the condition same as before shipping of the product as the speed reference value, and adding or subtracting the speed reference value by the compensation value, if there is a variation of load in the reciprocating motor compressor.

Also, with the present invention, the operation of the reciprocating motor compressor can be controlled precisely and accurately, by comparing the TDC reference value detected from the inflection point of the phase value and TDC value of the motor, outputting the corresponding comparison signal and controlling the operation of the reciprocating motor compressor with the switching control signal for controlling TDC of the motor according to the comparison signal.

Also, with the present invention, TDC error of the motor in the reciprocating motor compressor can be compensated by setting the TDC value at the point of 'TDC≈0' detected under the condition same as before shipping of the product as the TDC reference value, and adding or subtracting the TDC reference value by the compensation value, if there is a variation of load in the reciprocating motor compressor.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An apparatus for controlling operation of a reciprocating motor compressor, comprising:
   a speed detecting unit for detecting a first speed value of a motor on the basis of a current and voltage applied to a motor;
   a phase value detecting unit for detecting a second speed value of the motor at the inflection point of the detected phase value;
   a speed reference value storage unit for setting the second speed value as a speed reference value and storing the set speed reference value; and
   a control unit for comparing the stored speed reference value and the first speed value detected from the speed detecting unit, outputting the corresponding comparison signal, and controlling the speed of the motor with the generated switching control signal according to the comparison signal.

2. The apparatus of claim 1, wherein the second speed value of the motor is a speed value of the motor corresponding to the point of 'TDC (Top Dead Center)≈0'.

3. The apparatus of claim 2, wherein the phase value detecting unit detects the speed value corresponding to the point of 'TDC≈0' in a peculiar load condition.

4. The apparatus of claim 1, wherein the control unit compensates the speed reference value by adding or subtracting the speed reference value by a compensation value according to load variation, compares the compensated speed reference value and the first speed value of the motor detected by the speed detecting unit and outputs the corresponding comparison signal.

5. The apparatus of claim 4, wherein the control unit includes a lookup table for storing the compensation value.

6. The apparatus of claim 1, wherein the control unit includes:
   a comparator for comparing the speed reference value and the first speed value of the motor detected from the speed detecting unit and outputting the corresponding comparison signal; and
   a speed control unit for outputting the switching control signal for controlling the voltage applied to the motor according to the comparison signal outputted from the comparator.

7. The apparatus of claim 1, wherein the motor is used in the reciprocating motor compressor.

8. A method for controlling operation of a reciprocating motor compressor, comprising the steps of:
   detecting a phase difference between a first speed value of a motor and a current applied to the motor;
   detecting a second speed value of the motor from an inflection point of the detected phase value and storing the detected speed value as a speed reference value; and
   controlling speed of the motor on the basis of the speed reference value and first speed value of the motor.

9. The method of claim 8, wherein the second speed value of the motor is detected by repeatedly performing the process for detecting the inflection point of the phase value.

10. The method of claim 8, further comprising a step of compensating the speed reference value by adding or subtracting the speed reference value by the compensation value due to a load variation and comparing the compensated speed reference value and the first speed value of the motor.

11. The method of claim 10, further comprising a step of storing the compensation value.

12. An apparatus for controlling operation of a reciprocating motor compressor, comprising:
   a TDC (Top Dead Center) detecting unit for detecting a first TDC value of a piston in a compressor;
   a phase value detecting unit for detecting a second TDC value of the motor at the inflection point of the detected phase value after detecting the phase difference between a voltage and current applied to the motor in the compressor;
   a TDC reference value storage unit for setting the second TDC value as a TDC reference value and storing the set TDC value; and
   a control unit for comparing the stored TDC reference value and the first TDC value, outputting the corresponding comparison signal, and controlling the TDC of the motor with the generated switching control signal according to the comparison signal.

13. The apparatus of claim 12, wherein the second TDC value of the motor is a TDC value of the motor corresponding to the point of 'TDC≈0'.

14. The apparatus of claim 12, wherein a phase value detecting unit detects the TDC value corresponding to the point of 'TDC≈0' in a peculiar load condition.

15. The apparatus of claim 12, wherein the control unit compensates the TDC reference value by adding or subtracting the TDC reference value by a compensation value according to load variation, compares the compensated TDC reference value and the first TDC value and outputs the corresponding comparison signal.

16. The apparatus of claim 15, wherein the control unit includes a lookup table for storing the compensation value.

17. The apparatus of claim 12, wherein the control unit includes:
   a comparator for comparing the TDC reference value and the first TDC value and outputting the corresponding comparison signal; and
   a TDC control unit for outputting the switching control signal for controlling the voltage applied to the motor according to the comparison signal outputted from the comparator.

18. The apparatus of claim 12, wherein the motor is used in the reciprocating motor compressor.

19. A method for controlling operation of a reciprocating motor compressor, comprising the steps of:
   detecting a first TDC (Top Dead Center) value of a piston in the compressor;
   detecting a phase difference between a voltage and current applied to the motor in the compressor;
   detecting a second TDC value of the motor from an inflection point of the detected phase value and storing the detected TDC value as a TDC reference value; and
   comparing the TDC reference value and the first TDC value of the motor and controlling TDC of the motor on the basis of the comparison result.

20. The method of claim 19, wherein the second TDC value of the motor is detected by repeatedly performing the process for detecting the inflection point of the phase value.

21. The method of claim 19, further comprising a step of compensating the TDC reference value by adding or subtracting the TDC reference value by the compensation value due to a load variation and comparing the compensated TDC reference value and the first TDC value of the motor.

22. The method of claim 21, further comprising a step of storing the compensation value.

* * * * *